(12) United States Patent
Kwon et al.

(10) Patent No.: US 9,755,265 B2
(45) Date of Patent: Sep. 5, 2017

(54) ANODE FOR SECONDARY BATTERY AND SECONDARY BATTERY HAVING THE SAME

(71) Applicant: LG Chem, Ltd., Seoul (KR)

(72) Inventors: Yo-han Kwon, Daejeon (KR);
Sang-Wook Woo, Daejeon (KR);
Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 254 days.

(21) Appl. No.: 14/603,872

(22) Filed: Jan. 23, 2015

(65) Prior Publication Data

US 2015/0140383 A1    May 21, 2015

Related U.S. Application Data

(63) Continuation of application No. 14/083,944, filed on Nov. 19, 2013, now Pat. No. 8,968,937, which is a
(Continued)

(30) Foreign Application Priority Data

Jun. 2, 2011    (KR) .................. 10-2011-0053351

(51) Int. Cl.
*H01M 4/70*    (2006.01)
*H01M 10/04*    (2006.01)
(Continued)

(52) U.S. Cl.
CPC ......... *H01M 10/0422* (2013.01); *H01M 4/02* (2013.01); *H01M 4/36* (2013.01);
(Continued)

(58) Field of Classification Search
CPC ......... H01M 10/0422; H01M 10/0565; H01M 4/661; H01M 4/38; H01M 4/75;
(Continued)

(56) References Cited

U.S. PATENT DOCUMENTS 1,447,657 A    3/1923   Paul Gouin et al.
3,839,090 A  * 10/1974  Morelock ............... H01M 4/64
                                                   429/211
(Continued)

FOREIGN PATENT DOCUMENTS

CN         1388993 A     1/2003
CN       103348524 A    10/2013
(Continued)

OTHER PUBLICATIONS

Search report from European Application No. 12 84 4371, dated Mar. 16, 2015.
(Continued)

*Primary Examiner* — Cynthia K Walls
(74) *Attorney, Agent, or Firm* — Lerner, David, Littenberg, Krumholz & Mentlik, LLP

(57) ABSTRACT

The present invention relates to an anode for a secondary battery, comprising at least two anode wires which are parallel to each other and spirally twisted, each of the anode wires having an anode active material layer coated on the surface of a wire-type current collector; and a secondary battery comprising the anode. The anode of the present invention has an increased surface area to react with Li ions during a charging and discharging process, thereby improving the rate characteristics of a battery, and also release stress or pressure applied in the battery, e.g., the volume expansion of active material layers to prevent the deformation of the battery and ensure the stability thereof, thereby improving the life characteristic of the battery.

22 Claims, 4 Drawing Sheets

Related U.S. Application Data continuation of application No. PCT/KR2012/004365, filed on Jun. 1, 2012.

(51) Int. Cl.

| | | |
|---|---|---|
| *H01M 4/02* | (2006.01) | |
| *H01M 4/36* | (2006.01) | |
| *H01M 4/66* | (2006.01) | |
| *H01M 4/75* | (2006.01) | |
| *H01M 4/38* | (2006.01) | |
| *H01M 10/0565* | (2010.01) | |

(52) U.S. Cl.
CPC ............ *H01M 4/38* (2013.01); *H01M 4/661* (2013.01); *H01M 4/667* (2013.01); *H01M 4/668* (2013.01); *H01M 4/669* (2013.01); *H01M 4/75* (2013.01); *H01M 10/0565* (2013.01); *H01M 2004/027* (2013.01); *H01M 2300/0085* (2013.01)

(58) Field of Classification Search
CPC ........ H01M 4/669; H01M 4/36; H01M 4/668; H01M 4/667; H01M 4/02; H01M 2300/0085; H01M 2004/027
See application file for complete search history.

(56) References Cited

U.S. PATENT DOCUMENTS

| | | |
|---|---|---|
| 3,897,266 A | 7/1975 | Devitt et al. |
| 4,522,897 A | 6/1985 | Walsh |
| 2001/0005561 A1 | 6/2001 | Yamada et al. |
| 2002/0150820 A1 | 10/2002 | Kanai et al. |
| 2002/0187401 A1 | 12/2002 | Lee et al. |
| 2002/0192562 A1 | 12/2002 | Ferreira et al. |
| 2004/0062958 A1 | 4/2004 | Facchi et al. |
| 2005/0271796 A1 | 12/2005 | Neudecker et al. |
| 2007/0243456 A1 | 10/2007 | Ahn et al. |
| 2009/0123832 A1 | 5/2009 | Chigiri |
| 2010/0203372 A1 | 8/2010 | Kim et al. |
| 2010/0285356 A1 | 11/2010 | Choi et al. |
| 2010/0304274 A1* | 12/2010 | Bennett ............... H01M 4/8605 429/499 |
| 2010/0323242 A1 | 12/2010 | Choi et al. |
| 2011/0039156 A1 | 2/2011 | Tu et al. |
| 2011/0117414 A1 | 5/2011 | Choi et al. |
| 2011/0262809 A1 | 10/2011 | Kumagai et al. |
| 2012/0009331 A1 | 1/2012 | Kwon et al. |
| 2012/0015233 A1 | 1/2012 | Kwon et al. |
| 2012/0040246 A1 | 2/2012 | Sakai et al. |
| 2012/0156554 A1 | 6/2012 | Kwon et al. |
| 2013/0149580 A1 | 6/2013 | Kim |

FOREIGN PATENT DOCUMENTS

| | | |
|---|---|---|
| EP | 2533328 A2 | 12/2012 |
| EP | 2768059 A1 | 8/2014 |
| GB | 150961 A | 1/1922 |
| JP | H2-143779 A | 12/1990 |
| JP | H08-213049 A | 8/1996 |
| JP | H09-147845 A | 6/1997 |
| JP | 2001-068150 A | 3/2001 |
| JP | 2001110445 A | 4/2001 |
| JP | 2002-237295 A | 8/2002 |
| JP | 2005-011556 A | 1/2005 |
| JP | 2008047398 A | 2/2008 |
| JP | 2009007629 A | 1/2009 |
| JP | 2009-140904 A | 6/2009 |
| JP | 2010-073421 A | 4/2010 |
| JP | 2010129412 A | 6/2010 |
| KR | 20030081499 A | 10/2003 |
| KR | 20050030438 A | 3/2005 |
| KR | 20050099903 A | 10/2005 |
| KR | 20070009231 A | 1/2007 |
| KR | 100742739 B1 | 7/2007 |
| KR | 100804411 B1 | 2/2008 |
| KR | 20090009598 A | 1/2009 |
| KR | 2010-0077692 A | 7/2010 |
| KR | 2010-0121387 A | 11/2010 |
| KR | 20100127990 A | 12/2010 |
| KR | 20110054557 A | 5/2011 |
| KR | 2011-0089583 A | 8/2011 |
| KR | 20110090768 A | 8/2011 |
| KR | 10-1072292 B1 | 10/2011 |
| WO | 2010/032362 A1 | 3/2010 |
| WO | 2010052950 A1 | 5/2010 |
| WO | 2010/089991 A1 | 8/2010 |
| WO | 2010/107229 A2 | 9/2010 |
| WO | 2010107229 A2 | 9/2010 |
| WO | 2011093661 A2 | 8/2011 |

OTHER PUBLICATIONS

Machine translation of JP 2008-047398, retrieved from <https://www.j-platpat.inpit.go.jp/web/all/top/BTmTopEnglishPage> on May 22, 2015.

International Search Report for PCT/KR2012/004365 dated Jan. 2, 2013.

International Search Report for PCT/KR2012/008401 dated Feb. 28, 2013.

International Search Report for Application No. PCT/KR2012/008403 dated Feb. 28, 2013.

International Search Report for PCT/KR2012/008400 dated Mar. 4, 2013.

International Search Report for PCT/KR2012/008397 dated Mar. 29, 2013.

* cited by examiner

ANODE FOR SECONDARY BATTERY AND SECONDARY BATTERY HAVING THE SAME

CROSS-REFERENCE TO RELATED APPLICATION(S)

This application is a continuation of U.S. patent application Ser. No. 14/083,944, filed on Nov. 19, 2013, which is a continuation of International Application No. PCT/KR2012/004365 filed on Jun. 1, 2012, which claims priority from Korean Patent Application No. 10-2011-0053351 filed in the Republic of Korea on Jun. 2, 2011, the disclosures of which are incorporated herein by reference.

TECHNICAL FIELD

The present invention relates to an anode which is suitably used in secondary batteries, and a secondary battery comprising the anode.

BACKGROUND ART

Secondary batteries are devices which store electrical energy in a chemical form and generate electricity when needed. The secondary batteries are also referred to as rechargeable batteries because they can be charged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipments to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and the casing is filled with electrolyte. Because a predetermined mounting space for the electrode assembly is necessary in this process, the cylindrical, prismatic or pouch shape of the secondary batteries has a limitation in developing various shapes of mobile devices. Accordingly, there is a need for secondary batteries having a new structure that is variously adaptable in shape. To fulfill this need, suggestions have been made to develop flexible linear secondary batteries having a very high ratio of a length and a cross-sectional diameter, hereinafter referred to as cable-type secondary batteries.

However, the flexible cable-type secondary batteries are frequently subject to the external physical impact due to their structural characteristics, for example, the twist thereof, which may result in a short circuit. Further, when Si or Sn is used as an anode active material, the active material may peel off due to the expansion and shrinkage of electrodes caused by the repeated charging and discharging. Also, when an anode active material layer made of a metal, which is used to increase the capacity of batteries, is thick, it is difficult for lithium ions to diffuse in the anode active material layer, thereby substantially restricting the implementation of battery capacity.

DISCLOSURE

Technical Problem

The present invention is designed to solve the problems of the prior art, and therefore it is an object of the present invention to provide an anode for a secondary battery, having a spirally twisted form, which can exhibit good electrochemical reactivity and excellent resistance to stress and pressure applied in the battery.

Technical Solution

In order to accomplish the above object, in accordance with one aspect of the present invention, there is provided an anode for a secondary battery, comprising at least two anode wires which are parallel to each other and spirally twisted, each of the anode wires having an anode active material layer coated on the surface of a wire-type current collector.

Preferably, the twist rate of the anode wires is in the range of 0.01 to 10 mm per one twist.

In the present invention, the wire-type current collector may be made of stainless steel, aluminum, nickel, titanium, sintered carbon, copper; stainless steel surface-treated with carbon, nickel, titanium or silver; an aluminum-cadmium alloy; non-conductive polymer surface-treated with a conductive material; or a conductive polymer, but is not particularly limited thereto.

The conductive material may be polyacetylene, polyaniline, polypyrrole, polythiophene, polysulfur nitride, indium thin oxide (ITO), copper, silver, palladium or nickel.

Also, the conductive polymer may be polyacetylene, polyaniline, polypyrrole, polythiophene or polysulfur nitride, but is not particularly limited thereto.

The anode active material layer may comprise a metal (Me) such as Si, Sn, Li, Zn, Mg, Cd, Ce, Ni and Fe, an alloy containing the metal, an oxide of the metal, or a composite of the metal and carbon, but is not particularly limited thereto.

Further, the present invention provides a secondary battery comprising a cathode, an anode and an electrolyte, wherein the anode is the above-mentioned anode.

Advantageous Effects

In accordance with the present invention, the above-mentioned anode comprising several strands of anode wires in a spirally twisted form has an anode active layer which is thin as compared to a single strand anode coated with the same anode active material, to facilitate lithium ion diffusion, thereby providing good battery performances. Also, the anode of the present invention has an increased surface area to react with Li ions during a charging and discharging process, thereby improving the rate characteristics of a battery.

Furthermore, the anode of the present invention has a space present between the several strands of anode wires, which can release stress or pressure applied in the battery during a charging and discharging process, e.g., the expansion of active material layers, to prevent the deformation of the battery and ensure the stability thereof, thereby improving the life characteristic of the battery.

DESCRIPTION OF DRAWINGS

The accompanying drawing illustrates a preferred embodiment of the present invention and, together with the foregoing disclosure, serves to provide further understanding of the technical spirit of the present invention. However, the present invention is not to be construed as being limited to the drawings.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
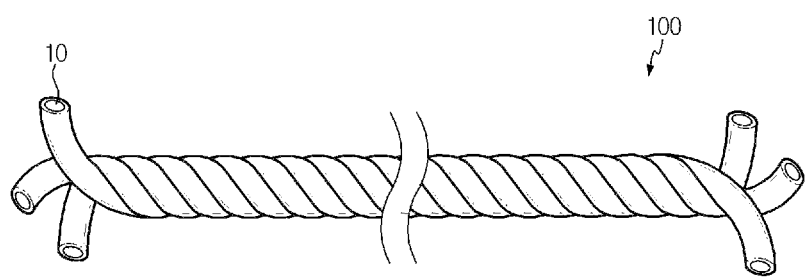
FIG. 1 is a perspective view schematically showing an anode according to a preferred embodiment of the present invention.
Figure 2:
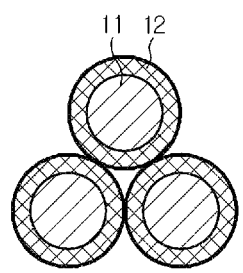
FIG. 2 is the cross-sectional view of FIG. 1.

FIGS. 1 and 2 schematically show an anode according to an embodiment of the present invention. Although a few exemplary embodiments of the present invention are shown in the drawings and described herein, which are provided for the purpose of illustrations only, and are not intended to limit the technical spirit of the present invention, various equivalents and modifications could be made thereto without departing from the spirit and scope of the invention.

Referring to FIGS. 1 and 2, the anode 100 of the present invention is characterized by comprising at least two anode wires 10 which are parallel to each other and spirally twisted, each of the anode wires having an anode active material layer 12 coated on the surface of a wire-type current collector 11.

The anode 100 of the present invention is configured to have several anode wires 10 being spirally twisted, and the twisting of several anode wires is not particularly limited. For example, the twisted anode wires may be obtained by placing several anode wires 10 side by side to be parallel to each other and then twisting them together, or by intercrossing several anode wires 10 one after the other similar to braided long hair.

Generally, when a metal such as Si and Sn, or a compound containing such a metal, which exhibits electrochemical characteristics by being alloyed with Li ions or dealloying due to its inherent properties, is used as an anode material having high capacity, there is a severely large volume change due to expansion which may cause the secondary battery to decay. This volume change weakens the electronic contact between metal active materials, thereby inhibiting the transfer of Li ions into the anode active material layer to cause cycle deterioration. Also, if the anode active material layer comprises the metal in a high density and has a thick thickness, it is difficult for Li ions to be diffused into the anode active material layer, thereby failing to provide sufficient capacity and good rate characteristics.

However, in the anode 100 of the present invention, several anode wires 10 in which an anode active material 12 is coated on the surface of a wire-type current collector 11 are twisted and spiraled to increase a surface area to react with Li ions during a charging and discharging process, thereby improving the rate characteristics of a battery. Also, the anode of the present invention has a space present between the several strands of anode wires, which can release stress or pressure applied in the battery during a charging and discharging process, e.g., the expansion of active material layers, to prevent the deformation of the battery and ensure the stability thereof, thereby improving the life characteristic of the battery.

Preferably, the twist rate of the anode wires is in the range of 0.01 to 10 mm per one twist. The twist rate is obtained by dividing the length of the anode wire by the number of twists. The lower value the twist rate has, the higher a twist degree is. When the twist rate is greater than 10 mm per one twist, a contact area between anode wires 10 is very small and the increase of surface area is insufficient. When the twist rate is lower than 0.01 mm per one twist, a twist degree becomes excessive causing damage of the anode wires 10, e.g., the peeling off of the anode active material layer and the rupture of the current collector.

The wire-type current collector 11 which is used in the present invention may be made of stainless steel, aluminum, nickel, titanium, sintered carbon, copper; stainless steel surface-treated with carbon, nickel, titanium or silver; an aluminum-cadmium alloy; non-conductive polymer surface-treated with a conductive material; or a conductive polymer, but is not particularly limited thereto.

The conductive material may be polyacetylene, polyaniline, polypyrrole, polythiophene, polysulfur nitride, indium thin oxide (ITO), copper, silver, palladium or nickel.

Also, the conductive polymer may be polyacetylene, polyaniline, polypyrrole, polythiophene or polysulfur nitride, but is not particularly limited thereto.

The anode active material layer may comprise a metal (Me) such as Si, Sn, Li, Zn, Mg, Cd, Ce, Ni and Fe, an alloy containing the metal, an oxide of the metal, or a composite of the metal and carbon.

In addition, the anode of the present invention may be an anode having a porous anode active material layer which may be formed on the surface of the current collector using an electroplating process or an anodizing process. The electroplating process is used in forming the active material layer on the surface of the current collector, in which hydrogen bubbles may be generated. By adjusting the amount and size of the hydrogen bubbles generated, an active material layer of a three-dimensional pore structure having a desired pore size may be formed. The anodizing process may be used in forming a metal oxide-based active material layer on the surface of the current collector. In this case, by adjusting the amount generated and the size of oxygen bubbles that may be generated under anodizing conditions, a metal oxide-based active material layer of a one-dimensional channel-shaped pore structure may be formed.

The anode of the present invention as mentioned above is used together with a cathode to form an electrode assembly, in which an electrolyte is introduced, to prepare a lithium secondary battery. The cathode and the electrolyte used to configure the electrode assembly may be any one which is conventionally used in the preparation of a lithium secondary battery.

Specifically, a cathode active material which may be used in the present invention preferably is lithium-containing transition metal oxide, for example, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0\leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, and $LiFePO_4$, or a mixture thereof. Also, a sulfide, selenide, or halide of lithium-containing transition metal may be used as well as the lithium-containing transition metal oxide.

The electrolyte which may be used in the present invention includes a gel polymer electrolyte of polyethylene oxide (PEO), polyvinylidene fluoride (PVdF), PVdF-hexafluoropropene (HFP), polymethylmethacrylate (PMMA), polyacrylonitrile (PAN), or polyvinylacetate (PVAc); and a solid polymer electrolyte of PEO, polypropylene oxide (PPO), polyethylene imine (PEI), polyethylene sulphide (PES), or PVAc.

The electrolyte may further comprise a lithium salt such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate and lithium tetraphenylborate.

Hereinafter, a cable-type secondary battery comprising the anode of the present invention is briefly described for its specific structure with reference to FIGS. 3 and 4 in which the same numerical signals represent the same or equivalent components.

Figure 3:
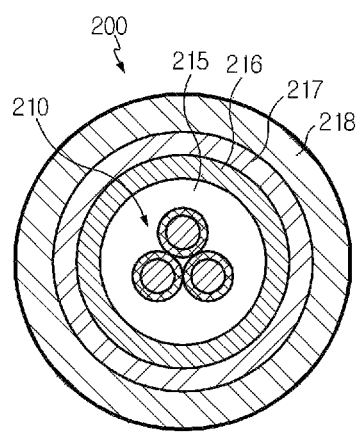
FIG. 3 is a cross-sectional view showing a cable-type secondary battery according to a preferred embodiment of the present invention.

Referring to FIG. 3, a cable-type secondary battery 200 according to the present invention has an inner electrode comprising at least one anode wire 210; an electrolyte layer 215 surrounding the inner electrode and acting as an ion channel; an outer electrode surrounding the electrolyte layer 215 and acting as a cathode by including a cathode active material layer 216 formed inside a pipe-type current collector 217; and a protective coating 218 surrounding the outer electrode.

According to the present invention, the plurality of inner electrodes 210 and the pipe-type outer electrode 216, 217 are provided to increase a contact area, thereby enhancing battery rate, and also the number of the inner electrodes may be adjusted to easily control a capacity balance between the inner electrode and the outer electrode. In such a cable-type secondary battery, the cathode having the active material layer 216 applied to the current collector 217 is preferably obtained by extrusion-coating an electrode slurry on the current collector using an extruder. Also, the inner electrode may be obtained by coating the twisted anode wires 210 with the electrolyte electrode 215 on the surrounding thereof or by inserting the twisted anode wires 210 in the electrolyte electrode 215. Accordingly, the cable-type secondary battery may be prepared by forming the inner electrode and the electrolyte electrode 215 and then forming the outer electrode 216, 217 and the protective coating 218 on the surface of the electrolyte electrode 215. Alternatively, the cable-type secondary battery may be prepared by forming the outer electrode 216, 217 including the electrolyte layer 215 and the protective coating 218 and inserting the inner electrode in the electrolyte layer 215, or forming the outer electrode 216, 217 and the protective coating 218, inserting the inner electrode and then filling the electrolyte layer 215.

In the present invention, the protective coating 218 is formed on the outer surface of the battery and acts as an insulator to protect the electrodes from moisture in air and external impact. The protective coating may be made of typical polymer resins, for example, PVC, high-density polyethylene (HDPE), or epoxy resin.

Figure 4:
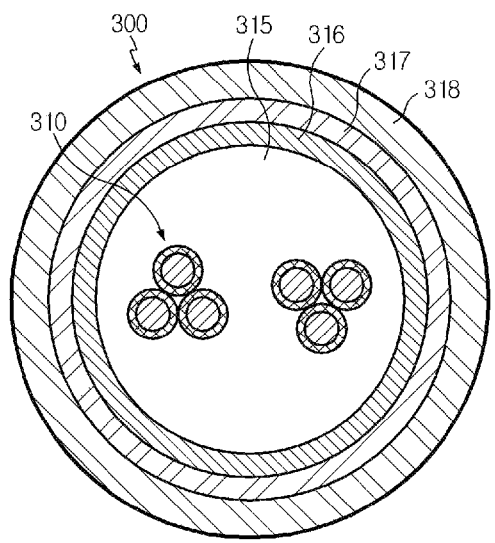
FIG. 4 is a cross-sectional view showing a cable-type secondary battery according to another preferred embodiment of the present invention.

In addition, as shown in FIG. 4, anode wires 310 according to the present invention may be used in several sets to prepare a cable-type secondary battery 300.

Hereinafter, the present invention will be described in detail through specific examples. However, the description proposed herein is just a preferable example for the purpose of illustrations only, not intended to limit the scope of the invention, so it should be understood that the examples are provided for a better explanation to an ordinary person skilled in the art.

EXAMPLE

Example 1

Preparation of Anode Having Six Twisted Strands

Figure 5:
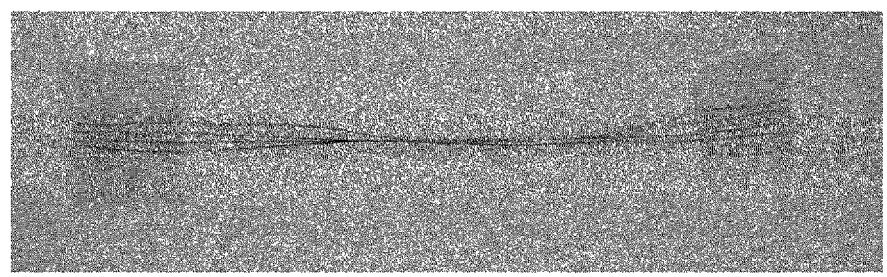
FIG. 5 is a photograph of an anode according to a preferred embodiment of the present invention.
Figure 5:
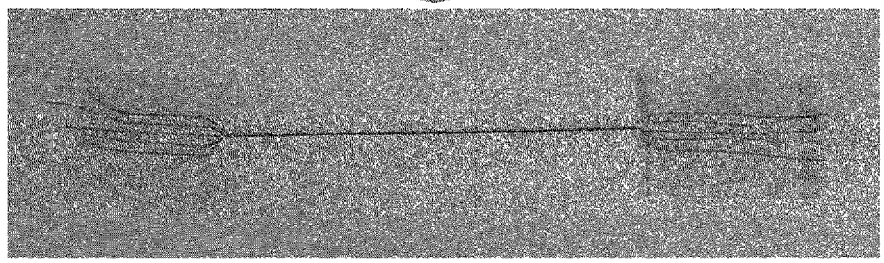

On the surface of a wire-type Cu current collector having a diameter of 150 μm, a Sn—Ni layer having a thickness of 2.5 μm was formed, to obtain an anode wire having an anode active material coating layer. The same procedure was carried out to obtain a total of six strands of anode wires. The six strands of anode wires were twisted to prepare an anode (as shown in FIG. 5).

Comparative Example 1

Preparation of Anode Having Single Strand
(Thickness of Anode Active Material Layer: 2.5 μm)

On the surface of a wire-type Cu current collector having a diameter of 150 μm, a Sn—Ni layer having a thickness of 2.5 μm was formed, to obtain an anode wire having an anode active material coating layer.

Comparative Example 2

Preparation of Anode Having Single Strand
(Thickness of Anode Active Material Layer: 5 μm)

On the surface of a wire-type Cu current collector having a diameter of 150 μm, a Sn—Ni layer having a thickness of 5 μm was formed, to obtain an anode wire having an anode active material coating layer.

Experimental Example

<Preparation of Coin-type Half-Cell Battery>

A lithium foil was used as a cathode and each of the anodes prepared in Example 1 and Comparative Examples 1 and 2 was used as an anode, and a polyethylene separator was interposed between the cathode and the anode, to obtain an electrode assembly. The electrode assembly was inserted in a battery case, to which an electrolyte solution containing 1M LiPF$_6$ dissolved in a mixed solvent of ethylene carbonate and diethyl carbonate (1:2 (volume ratio)) was introduced, to prepare a coin-type half-cell battery.

<Evaluation of Charging/Discharging Characteristics of Battery>

Figure 6:
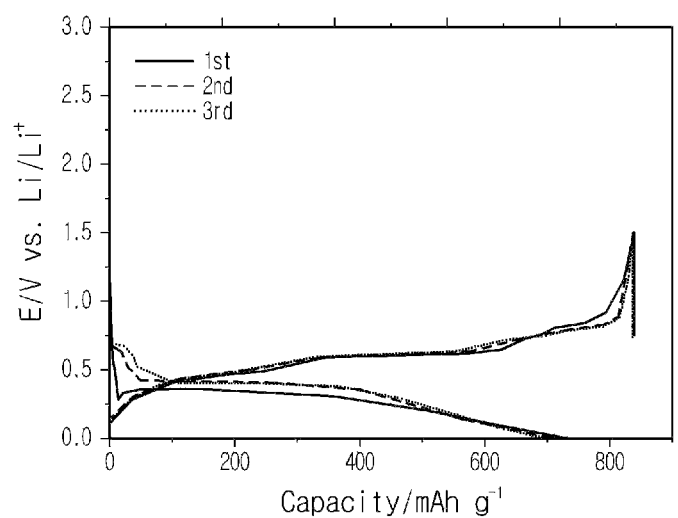
FIG. 6 is a graph showing the charging/discharging characteristic of the anode prepared in Example 1.
Figure 7:
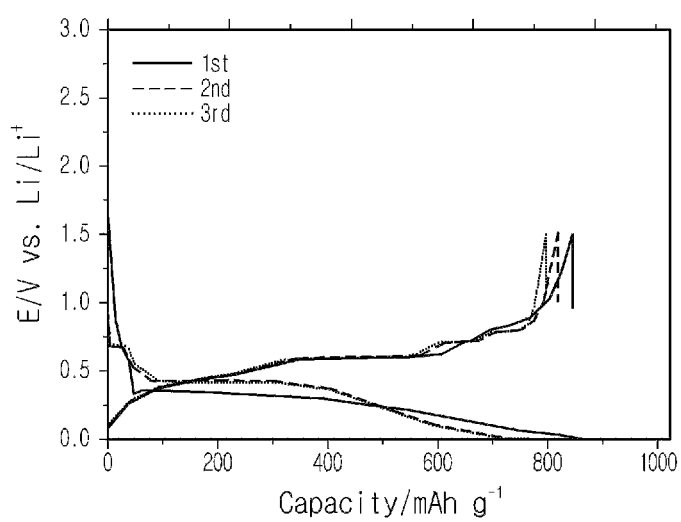
FIG. 7 is a graph showing the charging/discharging characteristic of the anode prepared in Comparative Example 1.
Figure 8:
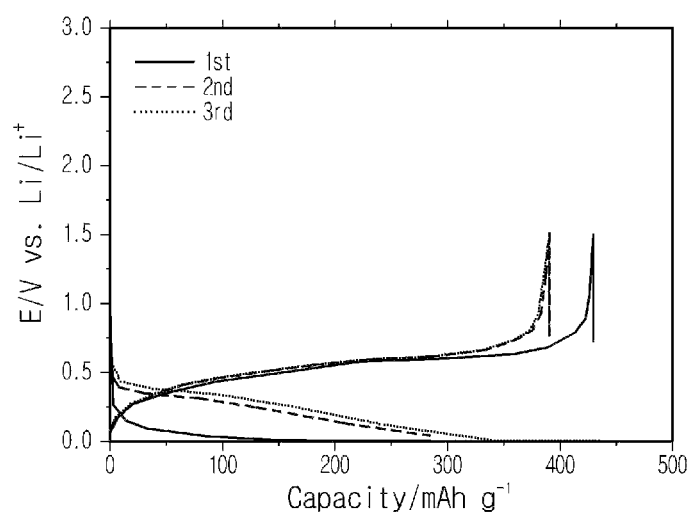
FIG. 8 is a graph showing the charging/discharging characteristic of the anode prepared in Comparative Example 2.

Each battery using each anode prepared in Example 1 and Comparative Examples 1 and 2 was charged with a constant current of 0.1 C up to 5 mV and then with a constant voltage of 5 mV, and the charging process for each battery was completed when the charging current reached 0.005 C. Each battery was discharged with a constant current of 0.1 C up to 1.5 V. The charging/discharging was repeated 30 times under the same conditions, and then the capacity of each battery was measured and shown in Table 1 and FIGS. 6 to 8.

TABLE 1

|  | 1$^{st}$ cycle | | 2$^{nd}$ cycle | | 3$^{rd}$ cycle | |
| --- | --- | --- | --- | --- | --- | --- |
|  | Q$_{1st}$ (mAhg$^{-1}$) | C$_{eff}$(%) | Q$_{2st}$ (mAhg$^{-1}$) | C$_{eff}$(%) | Q$_{3rdt}$ (mAhg$^{-1}$) | C$_{eff}$(%) |
| Ex. 1 | 846.9 | 93.4 | 843.4 | 99.9 | 843.7 | 98.9 |
| Com. Ex. 1 | 845.9 | 82.5 | 817.2 | 98.0 | 796.7 | 96.2 |
| Com. Ex. 2 | 429.4 | 83.9 | 390.6 | 96.7 | 390.3 | 96.8 |

In the case of Comparative Examples 1 and 2 in terms of battery capacity, the battery using the anode of Comparative Example 1 exhibits battery capacity increased almost by two times as compared to the battery using the anode of Comparative Example 2. This is because the anode of Comparative Example 2 has a thicker anode active material layer and a higher density which makes the diffusion of lithium ions in the anode active material layer more difficult, thereby deteriorating the storage efficiency of the lithium ions.

On comparing Example 1 and Comparative Example 1, the battery using the anode of Example 1 exhibits a greatly increased initial efficiency as compared to the battery using the anode of Comparative Example 1, and also exhibits good life characteristics. This is assumed due to the reason that the anode having six strands of anode wires prepared in Example 1 has a thin anode active material layer, and an increased surface area and a space present between the several strands of anode wires to facilitate lithium ion diffusion, thereby enhancing the initial efficiency. Also, it is considered that the inner structure of the twisted anode wires can release stress or pressure applied in the battery during a charging and discharging process, e.g., the expansion of active material layers, thereby improving the life characteristic of the battery.

What is claimed is:

1. An anode for a secondary battery, comprising at least two anode wires which are parallel to each other and twisted, wherein each of the at least two anode wires is a wire-type current collector having an anode active material layer coated on an entire surface thereof, wherein the anode active material layer of at least one of the anode wires is porous.

2. The anode for a secondary battery according to claim 1, wherein a twist rate of the anode wires is in the range of 0.01 to 10 mm per one twist.

3. The anode for a secondary battery according to claim 1, wherein the wire-type current collector is made of stainless steel, aluminum, nickel, titanium, sintered carbon, copper; stainless steel surface-treated with carbon, nickel, titanium or silver; an aluminum-cadmium alloy; non-conductive polymer surface-treated with a conductive material; or a conductive polymer.

4. The anode for a secondary battery according to claim 3, wherein the conductive material is selected from polyacetylene, polyaniline, polypyrrole, polythiophene, polysulfur nitride, indium thin oxide (ITO), copper, silver, palladium, nickel and a mixture thereof.

5. The anode for a secondary battery according to claim 3, wherein the conductive polymer is selected from polyacetylene, polyaniline, polypyrrole, polythiophene, polysulfur nitride and a mixture thereof.

6. The anode for a secondary battery according to claim 1, wherein the anode active material layer comprises an active material selected from the group consisting of a metal (Me) selected from Si, Sn, Li, Zn, Mg, Cd, Ce, Ni and Fe; an alloy containing the metal; an oxide of the metal; a composite of the metal and carbon; and a mixture thereof.

7. A secondary battery comprising a cathode, the anode according to claim 1, and an electrolyte.

8. A cable-type secondary battery comprising:
an inner electrode including at least one anode, an anode of the at least one anode including at least two anode wires which are parallel to each other and twisted, wherein each of the at least two anode wires is a wire-type current collector having an anode active material layer coated on an entire surface thereof;
an electrolyte layer that acts as an ion channel filled to surround the inner electrode;
an outer electrode surrounding a surface of the electrolyte layer, the outer electrode having a cathode active material layer formed in the inside of a pipe-type current collector; and
a protective coating formed around an outer electrode.

9. The anode for a secondary battery according to claim 1, wherein the at least two twisted anode wires define a space therebetween.

10. The anode for a secondary battery according to claim 1, wherein the porous anode active material layer is formed on the surface of the corresponding current collector using an electroplating process or an anodizing process.

11. The cable-type secondary battery according to claim 8, wherein the cathode active material layer includes lithium-containing transition metal oxide.

12. The cable-type secondary battery according to claim 8, wherein the cathode active material layer includes a material selected from the group consisting of LiCoO2, LiNiO2, LiMnO2, LiMn2O4, Li(NiaCobMnc)O2(0<a<1, 0<b<1, 0<c<1, a+b+c=1), LiNi1-yCoyO2, LiCo1-yMnyO2, LiNi1-yMnyO2(0<y<1), Li(NiaCobMnc)O4(0<a<2, 0<b<2, 0<c<2, a+b+c=2), LiMn2-zNizO4, LiMn2-zCozO4 (0<z<2), LiCoPO4, and LiFePO4, or a mixture thereof.

13. The cable-type secondary battery according to claim 8, wherein the cathode active material layer includes a sulfide, selenide, or halide of lithium-containing transition metal.

14. The secondary battery according to claim 7, wherein the electrolyte is selected from the group consisting of a gel polymer electrolyte of polyethylene oxide (PEO), polyvinylidene fluoride (PVdF), PVdF-hexafluoropropene (HFP), polymethylmethacrylate (PMMA), polyacrylonitrile (PAN), or polyvinylacetate (PVAc); and a solid polymer electrolyte of PEO, polypropylene oxide (PPO), polyethylene imine (PEI), polyethylene sulphide (PES), or PVAc.

15. The secondary battery according to claim 7, wherein the electrolyte further comprises a lithium salt.

16. The secondary battery according to claim 15, wherein the lithium salt is selected from the group consisting of LiCl, LiBr, LiI, LiClO4, LiBF4, LiB10Cl10, LiPF6, LiCF3SO3, LiCF3CO2, LiAsF6, LiSbF6, LiAlCl4, CH3SO3Li, CF3SO3Li, (CF3SO2)2NLi, lithium chloroborate, lower aliphatic lithium carbonate, lithium tetraphenylborate, and a mixture thereof.

17. The cable-type secondary battery according to claim 8, wherein the electrolyte layer includes an electrolyte selected from the group consisting of a gel polymer electrolyte of polyethylene oxide (PEO), polyvinylidene fluoride (PVdF), PVdF-hexafluoropropene (HFP), polymethylmethacrylate (PMMA), polyacrylonitrile (PAN), or polyvinylacetate (PVAc);

and a solid polymer electrolyte of PEO, polypropylene oxide (PPO), polyethylene imine (PEI), polyethylene sulphide (PES), or PVAc.

18. The cable-type secondary battery according to claim 8, wherein the electrolyte layer includes an electrolyte that further comprises a lithium salt.

19. The cable-type secondary battery according to claim 18, wherein the lithium salt is selected from the group consisting of LiCl, LiBr, LiI, LiClO4, LiBF4, LiB10Cl10, LiPF6, LiCF3SO3, LiCF3CO2, LiAsF6, LiSbF6, LiAlCl4, CH3SO3Li, CF3SO3Li, (CF3SO2)2NLi, lithium chloroborate, lower aliphatic lithium carbonate, lithium tetraphenylborate, and a mixture thereof.

20. The cable-type secondary battery according to claim 8, wherein the protective coating is comprised of a polymer resin.

21. The cable-type secondary battery according to claim 8, wherein the at least one anode includes at least two anodes.

22. An anode for a secondary battery, comprising at least two anode wires which are parallel to each other and intercrossed, wherein each of the at least two anode wires is a wire-type current collector having an anode active material layer coated on an entire surface thereof, wherein the anode active material layer of at least one of the anode wires is porous.

* * * * *